United States Patent [19]

Malhotra et al.

[11] Patent Number: 5,234,475

[45] Date of Patent: Aug. 10, 1993

[54] HYDROCARBON FUELS HAVING ONE OR MORE FULLERENES THEREIN AS INDENTIFICATION MEDIA

[75] Inventors: Ripudaman Malhotra, San Carlos; Donald C. Lorents, Palo Alto; Young K. Bae, Fremont, all of Calif.

[73] Assignee: SRI International, Menlo Park, Calif.

[21] Appl. No.: 745,035

[22] Filed: Aug. 14, 1991

[51] Int. Cl.[5] ............................. C10L 1/00; C10L 1/10
[52] U.S. Cl. .......................................... 44/282; 44/281
[58] Field of Search ................................... 44/281, 282

[56] References Cited

U.S. PATENT DOCUMENTS

| | | | |
|---|---|---|---|
| 4,203,728 | 5/1980 | Norton | 44/282 |
| 4,306,882 | 12/1981 | Stearns | 44/282 |
| 4,425,135 | 1/1984 | Jenkins | 44/281 |
| 4,671,800 | 6/1987 | Meyer et al. | 44/282 |

OTHER PUBLICATIONS

Kroto et al.; "$C_{60}$: Buckminsterfullerene"; Nature vol. 314 Nov. 1985 pp. 162-163.
Cox et al.; "Characterization of $C_{60}$ and $C_{70}$ Clusters"; J. Am. Chem. Soc; 1991, 113, 2940-2944.
Extract from Strem Chemicals, Inc. (date unknown).
Haufler et al; "Efficient Production of $C_{60}$ (Buckminsterfullerene) $C_{60}H_{36}$, and the Solvated Buckide Ion"; J. Phys. Chem. 1990 vol. 94.
Bae, Y. K., et al., "Production, Characterization, and Deposition of Carbon Clusters", Symposium on Clusters and Cluster Assembled Materials, Special Session on Buckminsterfullerene, Boston, Mass., Nov. 29, 1990.
Kratschmer, W., et al., "Solid $C_{60}$: A New Form of Carbon", Nature, vol. 347, Sep. 27, 1990, pp. 354-357.

Primary Examiner—Jacqueline V. Howard
Attorney, Agent, or Firm—John P. Taylor

[57] ABSTRACT

A hydrocarbon fuel is provided with one or more fullerene additives such as, for example, C60, C70, C74, C76, C78, C82, and C84 fullerenes, to serve as an identifying means for the fuel. The particular fullerene additive or additives may varying from the fullerene additive or additives in other fuels both by type as well as by amount or concentration present in the fuel. Thus, for example, if 7 different fullerenes are used in combinations of 1, 2, or 3 fullerenes, and in 5 different concentration amounts, there exists a possibility of as many as 4,935 different combinations of fuels which may all be separately identified by the presence of such combinations of fullerenes therein.

22 Claims, 1 Drawing Sheet

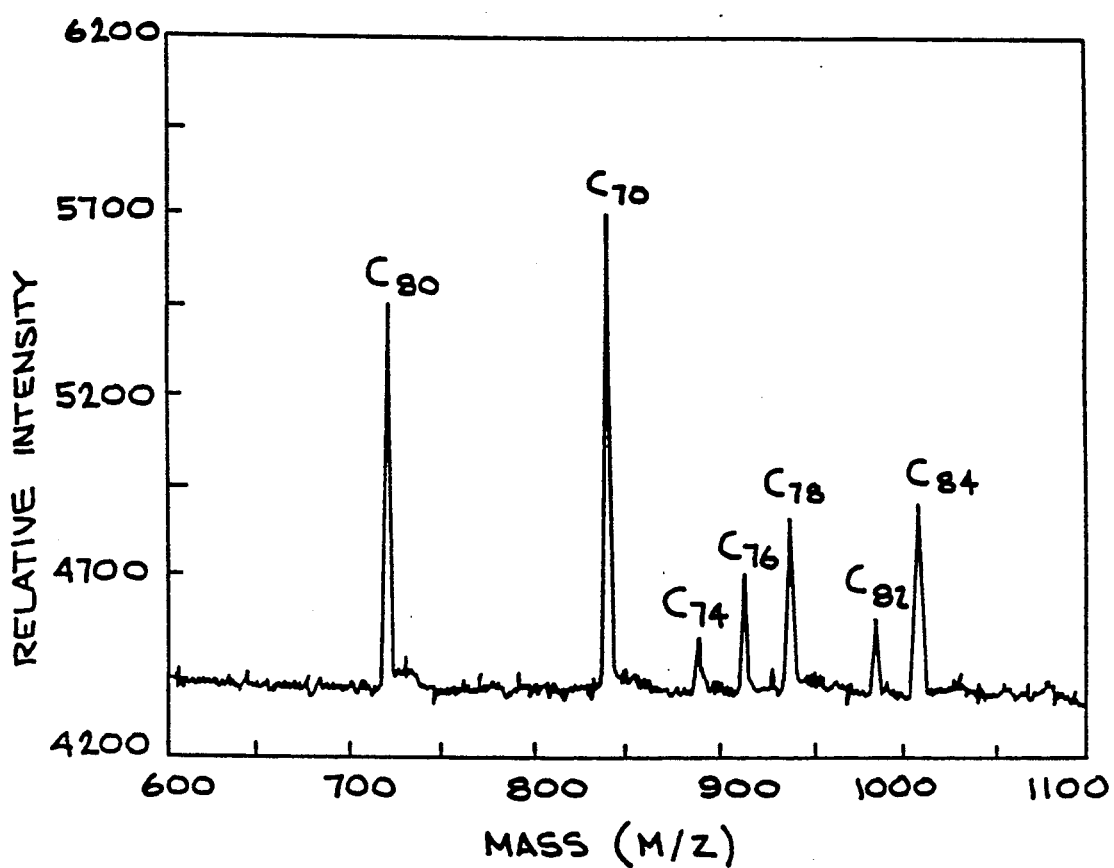

HYDROCARBON FUELS HAVING ONE OR MORE FULLERENES THEREIN AS INDENTIFICATION MEDIA

BACKGROUND OF THE INVENTION

Field of the Invention

This invention relates to a hydrocarbon fuel having one or more fullerenes therein to permit identification of the particular fuel by the fullerenes therein.

Description of the Related Art

The identification of particular hydrocarbon fuel such as gasolines, diesel fuels, and jet fuels is useful for purposes of identification of type of fuel, origin of fuel, and even location of such fuel, for example when an inadvertent spill occurs. Such identification of origin would also be useful from a liability standpoint when accidents or spills occur.

However, previous attempts to add to hydrocarbon fuels identifying additives such as dyes have been complicated by the fact that the normal detection of such dyes is by their fluorescence, and gasoline and other fuels also fluoresce strongly without such dyes. Furthermore, in the event of spills, such dyes tend to adsorb to the soil and thus are removed from the spilled fuel.

It would, therefore, be desirable to provide a hydrocarbon fuel which also contains an identifying additive which would be soluble in such a hydrocarbon fuel, including an aromatic hydrocarbon fuel; which additive would be nonpolar and would not adsorb on normal adsorption materials found in soil, such as alumina, silica; which additive would not normally be found in the environment; and which additive would have unique features in its optical spectra which could be used for identification purposes.

SUMMARY OF THE INVENTION

It is, therefore, an object of the invention to provide a hydrocarbon fuel containing one ore more additives capable of serving as an identification means; soluble in the hydrocarbon fuel; nonpolar and nonadsorbant on normal adsorption materials found in soil such as alumina, silica; not normally be found in the environment; and having unique optical spectra which an be used for identification purposes.

It is another object of the invention to provide a hydrocarbon fuel containing one or more additives capable of serving as identification means comprising a hydrocarbon fuel containing one or more fullerene additives.

These and other objects of the invention will be apparent from the following description and accompanying drawings.

BRIEF DESCRIPTION OF THE DRAWINGS

The sole FIGURE is a graph showing the mass spectrum of a number of fullerenes obtained by surface analysis of soot by laser ionization at 800° C.

DETAILED DESCRIPTION OF THE INVENTION

In accordance with the invention, a hydrocarbon fuel is provided with one or more fullerene additives to serve as an identifying means for the fuel. The particular additive or additives may vary from the additive or additives in other fuels both by type as well as by amount present in the fuel.

By use of the term "hydrocarbon fuels" which may be modified to provide for the inclusion of such identifying means therein, it is intended to include gasoline, diesel fuel, kerosene, jet fuel, No. 1 and No. 2 heating oils, as well as any other normally liquid aliphatic, aromatic, or heterocyclic organic materials which may be used as fuels or fuel additives.

The fullerene additives used in the practice of this invention comprise clustered carbon structures generally spherical in shape and having a carbon content generally ranging from about 50 to about 90 carbons, although larger carbon content fullerenes are also known to exist and may be useful in the practice of the invention. These fullerene materials are also distinguishable from other carbon forms such as graphite, diamond, or carbon black in that such fullerene identification additives are dissolvable in hydrocarbon solvents such as, for example, toluene and benzene; and they evaporate at much lower temperatures, i.e. $<1000°$ C., than do conventional forms of carbon, e.g., graphite, which sublimes at over 3600° C. at ambient pressure. Such fullerene compounds, as shown in FIG. 1, are known to exist, for example, as $C_{60}$, $C_{70}$, $C_{74}$, $C_{76}$, $C_{78}$, $C_{82}$, and $C_{84}$ molecules, signifying the number of carbons in the particular fullerene structure. Other fullerenes known to exist and which may be used in the practice of this invention are $C_{86}$, $C_{88}$, and $C_{90}$, and on up by two carbon atoms, e.g., $C_{92}$, $C_{94}$, etc. However, the higher carbon number fullerenes are not as easily obtained by present known methods.

Formation of these fullerene structures, which are used as hydrocarbon fuel additives in the composition of the invention, may be by the formation of soot from graphite electrodes followed by evaporation or solvent separation of the fullerenes produced in the soot from the remaining carbon forms therein.

Such formation methods are described, for example, by Kratschmer et al. in "Solid $C_{60}$: A New Form of Carbon", published in Nature, Volume 247, pp 354–357, on 27 Sep. 1990; and by Y. K. Bae et al. in "Production, Characterization, and Deposition of Carbon Clusters", prepared for the Symposium on Clusters and Cluster Assembled Materials Special Session on Buckminsterfullerenes, in Boston, Mass. on Nov. 29, 1990, and published in The Proceedings of the 1990 Meeting of the MRS Society.

Such fullerenes, after formation such as by the above described methods, may be separated from one another, i.e., purified, so that each may be independently used (or in particular combinations) as identifying means in the modified hydrocarbon fuel of the invention, by mass spectrographic techniques or by UV-Visible spectroscopy. In situations where more than one fullerene is used, it may be necessary to use mass spectroscopy or some other chromatographic procedure like High Pressure Liquid Chromatography (HPLC) to quantify the amounts of different fullerenes.

The amount of such fullerene additive or additives included in the modified hydrocarbon fuel of the invention preferably will comprise an insignificant amount which will be insufficient to alter any of the properties of the particular fuel. Amounts of such fullerene additives ranging from 0.01 to 100 parts per million (ppm) are detectable by optical absorption spectra, i.e., by visible spectroscopy. Larger amounts may be used, but are not preferred, at least from an economical standpoint.

However, if the same identifying fullerene molecule is to be used for two different fuels, with the difference between the identification means only being a difference in the amount of additive present in the fuel, it would be preferable if the difference in amount varied by a factor of about 10. That is, if 0.1ppm of a particular fullerene such as the C-60 fullerene was added to one fuel, it would be preferable if the amount of C-60 additive added to a second fuel was 0.01, 1.0, 10, or 100 ppm, so that this amount would be readily distinguishable from the 0.1 ppm amount in the first fuel by absorption spectroscopy, mass spectrometry, or other detection means.

As stated above, each hydrocarbon fuel may have its own unique identification either by type of fullerene added, combination of fullerenes added, amount of fullerene or fullerenes added, or by any combination of the above.

The following table illustrates how various combinations of type and amounts of fullerene additive(s) can be used, in accordance with the invention, to provide separate identification of a number of hydrocarbon fuels in which such fullerene identification means would be respectively dissolved.

TABLE

| Fuel | Fullerene | Amount(ppm) |
| --- | --- | --- |
| Gasoline A | C-60 | 0.01 |
| Gasoline B | C-60 | 0.1 |
| Gasoline C | C-60/C-70 | 0.01:0.01 |
| Diesel Fuel A | C-60 | 1.0 |
| Diesel Fuel B | C-70 | 0.01 |
| Diesel Fuel C | C-74 | 0.01 |
| Jet Fuel A | C-60/C-78 | 0.1:0.01 |
| Jet Fuel B | C-74/C-82 | 0.01:0.01 |
| Heating Oil A | C-76/C-84 | 0.01:10 |
| Heating Oil B | C-60/C-74/C-84 | 100:1.0:0.01 |

Thus, it can be readily seen that varying the amount of each fullerene additive, the type of fullerene additive, the combination of fullerene additives, and both types and amounts of fullerene additive(s) added to the particular hydrocarbon fuel, results in numerous additive possibilities, each readily identifiable from others. For example, if the amounts added range from 0.01 to 100 ppm in order of magnitude amounts (5 different concentration amounts), and 7 fullerenes are used, in any combination of 1, 2, or 3 fullerenes, there exists a possibility of $(5 \times 7) + [(7 \times 6)/2 + (5 \times 5)] + [(7 \times 6 \times 5)/(3 \times 2) \times (5 \times 5 \times 5)] = 4,935$ different combinations which may be used, i.e., 4,935 different fuels may all be separately identified just by these combinations. Naturally, if more than three fullerenes are used at the same time in any combination of types and concentration, the above number would increase, i.e., by twenty fold if four different fullerenes were used.

Thus, the invention provides a hydrocarbon fuel characterized by the presence therein of one or more buckminsterfullerene additives which serve as a unique identifying means for the particular fuel. The particular fullerene additive or additives present in the fuel may vary from the fullerene additive or additives in other fuels both by type (total number of carbon atoms) as well as by amount of the particular fullerene or fullerenes present in the fuel.

Having thus described the invention what is claimed is:

1. An improved hydrocarbon fuel selected from the group consisting of gasoline, diesel fuel, kerosene, jet fuel, No. 1 heating oil, and No. 2 heating oil containing a detectable amount of one or more fullerene additives therein serving as identification means for said fuel wherein said fullerenes are present in an amount insufficient to alter any of the combustion properties of the fuel.

2. The improved hydrocarbon fuel of claim 2 wherein the amount of said one or more fullerene additives present in said fuel is at least about 0.01 ppm for each fullerene additive.

3. The improved hydrocarbon fuel of claim 2 wherein the amount of said one or more fullerene additives present in said fuel varies from at least about 0.01 ppm to about 100 ppm for each fullerene additive.

4. The improved hydrocarbon fuel of claim 2 wherein the amount of said one or more fullerene additives present in said fuel varies by a factor of about 10 from the amount of the same fullerene additive added to another hydrocarbon fuel to expedite identification of one hydrocarbon fuel from another.

5. The improved hydrocarbon fuel of claim 2 wherein one or more of said fullerene additives are selected from the group consisting of C-60, C-70, C-74, C-76, C-78, C-82, and C-84 fullerenes.

6. The improved hydrocarbon fuel of claim 5 wherein one or more of said fullerene additives are selected from the group consisting of C-60 and C-70 fullerenes.

7. An improved hydrocarbon fuel selected from the group consisting of gasoline, diesel fuel, kerosene, jet fuel, No. 1 heating oil and No. 2 heating oil containing at least about 0.01 ppm of two or more buckminsterfullerenes additives selected from the group consisting of C-60, C-70, C-74, C-76, C-78, C-82, and C-84 fullerenes added to said hydrocarbon fuel to expedite identification of the particular fuel wherein said fullerenes are present in an amount insufficient to alter any of the combustion properties of the fuel.

8. The improved hydrocarbon fuel of claim 7 wherein the amount of said two or more fullerene additives present in said fuel varies from at least about 0.01 ppm to about 100 ppm for each fullerene additive.

9. The improved hydrocarbon fuel of claim 7 wherein said two or more of said fullerene additives are selected from the group consisting of C-60 and C-70 fullerenes.

10. The improved hydrocarbon fuel of claim 7 wherein at least three fullerenes additives are added to each hydrocarbon fuel to expedite identification of the particular fuel.

11. An improved hydrocarbon fuel containing from at least about 0.01 ppm to abut 100 ppm of three or more fullerenes selected from the group consisting of C-60, C-70,C-74, C-76, C-78, C-82, and C-84 fullerenes wherein said fullerenes are present in an amount insufficient to alter any of the combustion properties of the fuel.

12. A method for modifying one or more hydrocarbon fuels to permit subsequent identification of each such hydrocarbon fuel so modified which comprises adding to each of said hydrocarbon fuels one or more fullerene additives in a concentration and/or molecular weight of said one or more fullerenes which is unique to said modified fuel wherein said fullerenes are present in an amount insufficient to alter any of the combustion properties of the fuel.

13. The method of claim 12 wherein said step of modifying said one or more hydrocarbon fuels comprises adding to each of said hydrocarbon fuels one or more fullerenes in a concentration of at least about 0.01 ppm per fullerene.

14. The method of claim 13, wherein said step of modifying said one or more hydrocarbon fuels comprises adding to each of said hydrocarbon fuels one or more fullerenes selected from the group consisting of C-60, C-70, C-74, C-76, C-78, C-82, and C-84 fullerenes.

15. The method of claim 13 wherein said step of modifying said one or more hydrocarbon fuels comprises adding to each of said hydrocarbon fuels two or more fullerenes selected from the group consisting of C-60, C-70, C-74, C-76, C-78, C-82, and C-84 fullerenes.

16. The method of claim 13 wherein said step of modifying said one or more hydrocarbon fuels comprises adding to each of said hydrocarbon fuels three or more fullerenes selected from the group consisting of C-60, C-70, C-74, C-76, C-78, C-82, and C-84 fullerenes.

17. The method of claim 13 including the further step of varying the concentration of a particular fullerene additive added to one fuel from the concentration of the same fullerene added to a second fuel by at least a factor of 10.

18. An improved hydrocarbon fuel containing two or more fullerene additives therein serving as identification means for said fuel in an amount of at least about 0.01 ppm for each fullerene additive present in said fuel.

19. A method for modifying one or more hydrocarbon fuels to permit subsequent identification of each such hydrocarbon fuel so modified which comprises adding to each of said hydrocarbon fuels two or more fullerene additives, in a concentration and/or molecular weight of said two or more fullerenes in said modified hydrocarbon fuel which is unique to said modified fuel.

20. A method for modifying one or more hydrocarbon fuels selected from the group consisting of gasoline, diesel fuel, kerosene, jet fuel, No. 1 heating oil, and No. 2 heating oil to permit subsequent identification of each such hydrocarbon fuel so modified which comprises adding to each of said hydrocarbon fuels one or more fullerene additives in a concentration and/or molecular weight of said one or more fullerenes which is unique to said modified fuel.

21. A method for identifying hydrocarbon fuels from one another which comprises:
   a) adding to at least one of said hydrocarbon fuels one or more fullerene additives in a concentration and/or molecular weight of said one or more fullerenes which is unique to said modified fuel; and
   b) subsequently detecting the concentration and/or molecular weight of said one or more fullerenes in said modified hydrocarbon fuel to thereby identify the particular hydrocarbon fuel.

22. The improved hydrocarbon fuel of claim 18 wherein at least three fullerenes additives are added to each hydrocarbon fuel to expedite identification of the particular fuel.

* * * * *